Sept. 20, 1955     E. E. BRADLEY     2,718,097
LAWN MOWER SHARPENER
Filed April 30, 1954
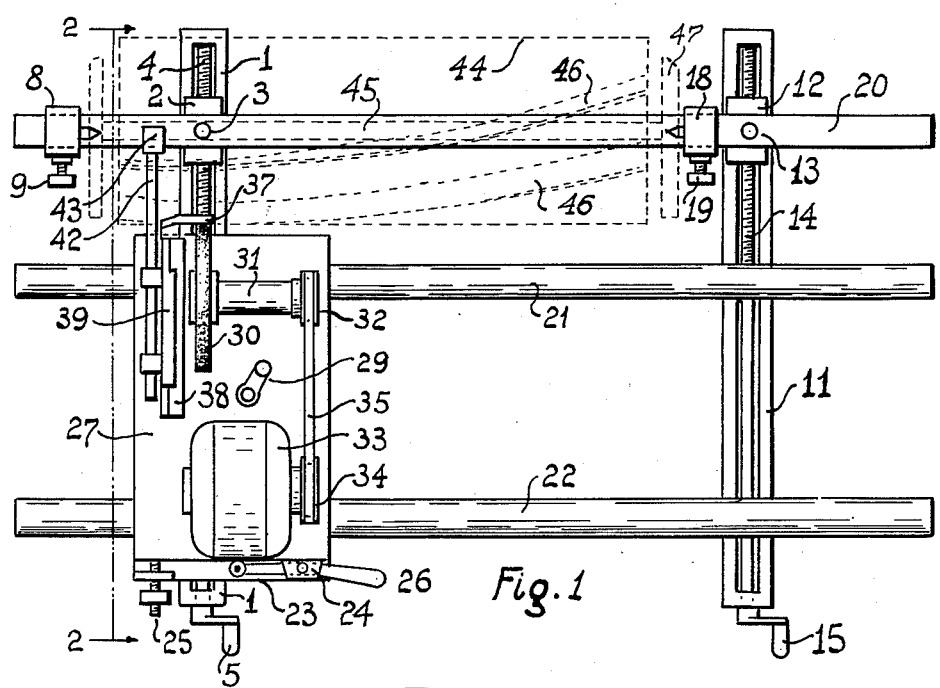
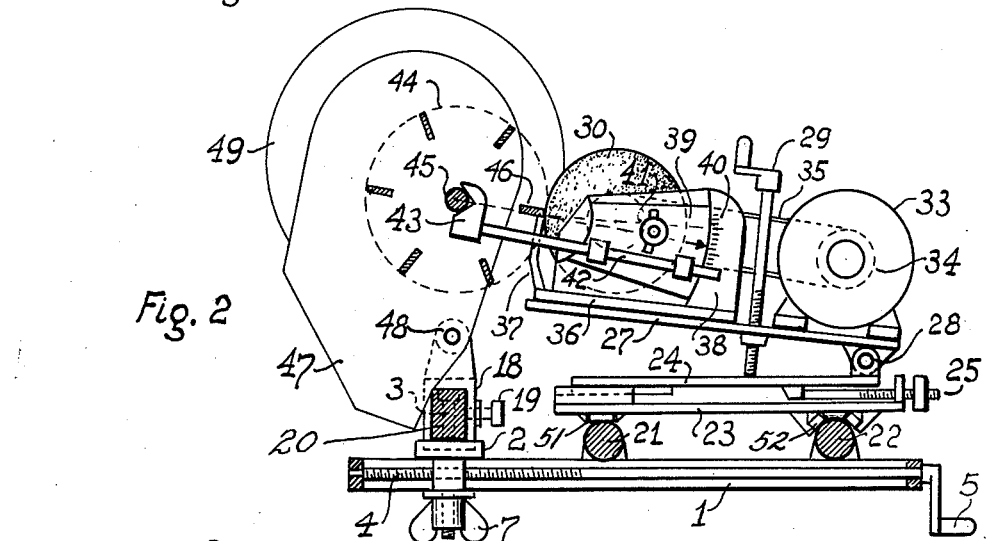
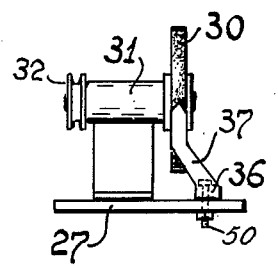
INVENTOR.
EARL E. BRADLEY
BY Zoltan O. Szalley
Patent Agent

United States Patent Office 2,718,097
Patented Sept. 20, 1955

2,718,097

LAWN MOWER SHARPENER

Earl E. Bradley, Branford, Conn.

Application April 30, 1954, Serial No. 426,871

5 Claims. (Cl. 51—48)

My invention relates to improvements in lawn mower sharpeners.

For the most efficient operation of the lawn mower reel it is essential that the reel blades be ground to have the relief angle specified for the particular make of lawn mower, and also to have the cutting edge of the reel blades equidistant from the axis of the reel.

With the customary lawn mower sharpeners these two conditions can be attained only by a time consuming method of trial and error, and usually with considerable inaccuracy, for the following reasons:

In the customary lawn mower sharpeners the relief angle obtained at a given adjustment can be determined only by a trial grinding on the reel blade because the same adjustment gives different relief angles for reels of different diameters. Therefore, the first adjustment is only tentative and it hardly ever gives the required relief angle. Usually several corrections in the adjustment and several trial grindings are needed before the specified relief angle can be approximated.

The regulation of the distance between the cutting edge of the reel blade and the axis of the reel is accomplished by mounting the lawn mower to be sharpened on slidable supports which are adjustable with respect to the grinding means. In the customary lawn mower sharpeners the reel blade is located entirely between these slidable supports, with the result that the sliding of a support changes the distance of every point of the reel blade. This means that if one end of the reel is set to the required distance, the moving of the other end of the reel to the same distance will not give an equidistant edge because this second adjustment will have changed the distance of the starting point, making it necessary to repeat the adjustment, usually several times, in order to reduce the difference in the distances at the two ends of the reel to a negligible value.

One of the principal objects of my invention is to provide a lawn mower sharpener which can be set accurately and conveniently, by a single adjustment, to grind the reel blade of a lawn mower of any type and size to the specified relief angle.

Another important object of my invention is to provide a lawn mower sharpener which can be set accurately and conveniently, by a single adjustment, to grind the reel blade of a lawn mower of any type and size, so that all points of the cutting edge will be equidistant from the axis of the reel.

A further object of my invention is to provide a lawn mower sharpener which can sharpen right and left twist reels with equal accuracy and convenience of adjustment, without the need of making any changes in the arrangement of the parts of the lawn mower sharpener.

Other objects and advantages of my invention will be apparent during the course of the following description.

In the accompanying drawing, wherein for the purpose of illustration, is shown a preferred form of my invention, Figure 1 is a plan view of my lawn mower sharpener, with the lawn mower reel clamped for sharpening, and the grinder carriage in position for the first adjustment.

Figure 2 is a vertical sectional view of the same, on line 2—2 of Figure 1.

Figure 3 is a front elevational view of the blade supporting finger, looking towards the grinding wheel.

In the accompanying drawing, forming a part of this application, like numerals are employed to designate like parts throughout the same. In Fig. 1 the numerals 1 and 11 designate a pair of parallel supporting rails, carrying blocks 2 and 12 respectively, which are slidable on the rails by means of lead screws 4 and 14, rotated by cranks 5 and 15 respectively. Attached to these blocks are threaded studs 6 and 16, carrying thumb nuts 7 and 17 respectively, the function of which is to secure the blocks in position on the rails.

Connected to the blocks 2 and 12 by means of pivots 3 and 13, respectively, is the work carrying bar 20, on which the work supporting clamps 8 and 18 are slidably mounted, and may be secured in position on the bar 20 by screws 9 and 19, respectively. The function of these clamps 8 and 18 is to securely hold the lawn mower to be sharpened which is accomplished by sliding the tapered ends of these clamps into the bolt holes of the lawn mower frame left open by the removal of the bottom knife of the lawn mower. The position of the lawn mower clamped in my machine is shown in Fig. 2 of the drawing, in which the numeral 47 designates the frame of the lawn mower, 48 the bolt hole engaged by the clamp, 49 the wheel of the lawn mower, 44 the reel of the lawn mower with reel shaft 45 and blades 46. Other parts present in the clamped lawn mower, such as the handle, motor, gearing, etc., are not shown in the drawing as their character and position are well known. In the clamped lawn mower the center of gravity is so located that the lower end of the frame 47 is pressed by the weight against the carrying bar 20, giving a stable support to the clamped lawn mower.

It is an essential feature of my invention, clearly shown in Fig. 1, that a portion of the reel of the clamped lawn mower is disposed outside of the rails 1 and 11, so that a point of the reel blade 46, to be sharpened, is located in the plane in which the axis of the pivot 3 travels during the sliding of the block 2. This point of said blade 46 has the important characteristic that its distance from the path of the grinding wheel 30 is not affected by the motion of pivot 13. This clamping arrangement is accomplished by extending the bar 20 beyond the rail 1 and by disposing the clamp 8 on the extension of the bar 20. In Fig. 1 both ends of bar 20 are extended beyond the rails in order to give a choice of clamping the lawn mower to either extensions, it will be, however, within the spirit of my invention to extend the bar 20 only at one end.

Secured at right angle to the rails 1 and 11 are a pair of parallel guides 21 and 22 carrying the grinder carriage 23, which is supported by rollers 51 and 52 adapted to run on said guides. Mounted on this grinder carriage 23 is the base plate 24, which is slidable perpendicularly to the parallel guides 21 and 22 by means of a manual lever 26, the end of which is pivoted to the grinder carriage 23 and an intermediate point is pivoted to the base plate 24. The handle of this lever 26 may be used also for the manual moving of the grinder carriage 23 along the guides 21 and 22. The sliding of the base plate 24 toward the work carrying bar 20 is adjustably limited by a stop screw 25.

Attached to the base plate 24 by a horizontal pivot or hinge 28 is the grinder base 27, the angular position of which is adjustable by means of an adjusting screw 29. Carried by said grinder base 27 are the stand 31 on which the grinding wheel 30 is rotatably mounted and the motor 33 which drives the grinding wheel 30 by means of pulleys 32 and 34 and belt 35.

Mounted on the grinder base 27 is the blade support 36, terminating in the blade support finger 37, said blade support 36 being adjustably secured to base 27 by bolt 50, passing through elongated slot, permitting the disposition of the blade support finger 37 adjacent to the working face of the grinding wheel 30 at varying diameter of the grinding wheel, caused by the wear and the exchange of the wheel. The function of this blade support finger is to hold the reel blade in the proper position to the grinding wheel. The tip of this finger has a convex profile with symmetrical right and left slopes to permit the sharpening of right and left twist reel blades with equal accuracy and without any change in the blade support finger. A frontal view of this blade support finger is shown in Fig. 3 of the drawing.

Referring again to Fig. 2, the numeral 38 designates the dial plate, which is attached to the blade support 36, and has a circular groove defined by two concentric circles the geometric center of which is at the tip of the blade support finger 37. Slidably mounted in this circular groove is the segment plate 39, which may be secured in position by the set screw 41. The degree scale 40 serves to indicate the angular position of the segment plate 39 with respect to the dial plate 38. Slidably mounted on the segment plate 39 is the measuring arm 42 having a terminal 43 with a V-shaped notch. The distance between the center of this notch and the center line of the arm 42 is the same as the distance from the tip of the finger 37 to the center line of the said arm 42. In the preferred form of my invention the connection between the dial plate and the blade support is such that the dial plate, together with the segment plate and the measuring arm, may be easily detached and removed after the adjustments of the lawn mower sharpener are completed.

In the preferred form of my invention, shown in the accompanying drawing, the grinding wheel used is disk shaped with the axis of rotation parallel to the guides 21 and 22; my present invention, however, is applicable just as well for grinding wheels of other shapes, such as conical, cup-shaped, etc. and having the axis of rotation at various angles to said guides.

It is also within the spirit of my invention to drive the grinding wheel by other means than the belt drive shown.

The operation of my invention is as follows:

In the operation of my lawn mower sharpener three phases may be distinguished: the clamping operation, the setting up operation and the grinding operation.

One of the important advantages of my lawn mower sharpener is that the clamping operation does not require the laborious dismantling of the lawn mower to be sharpened. The only part to be taken off from the lawn mower is the bed knife, which is the subject of a separate sharpening. The sharpening of this bed knife, though it can be done in my lawn mower sharpener very satisfactorily, is not included in my present invention.

After the removal of the bed knife, the lawn mower to be sharpened is secured to the work carrying bar 20, by means of clamps 8 and 18, engaging the bolt holes from which the bolts, securing the bed knife, have been removed. One of said clamps being disposed on the extension of the work carrying bar 20, it is possible to clamp the lawn mower so that, while the major portion of the reel 44 will be between the rails 1 and 11, a smaller portion of said reel will extend outside of said rails. Following this, the clamps 8 and 18 are secured in position by set screws 9 and 19, respectively.

The principal advantage of my lawn mower sharpener over the prior art is that the customarily laborious setting up operation is reduced to two simple and easy adjustments, which are accomplished as follows: For the first adjustment, by means of the scale 40 of the dial plate 38, the segment plate 39 is set to the degrees of the relief angle specified, and, by means of the set screw 41, said segment plate is secured in position on said dial plate. Then, by moving the grinder carriage 23 on the parallel guides 21 and 22, the grinding wheel 30 is brought in line with the supporting rail situated under the reel, which in case of Fig. 1 is the rail 1. Following this, the grinder base 27 is raised or lowered, by adjusting screw 29, until the shaft of the reel, marked 45 on Fig. 2, will fit into the V-shaped notch of the terminal 43 of the measuring arm 42. Simultaneously, by means of the lever 26, the grinding wheel 30 is advanced until it makes contact with the reel blade 46. When this condition, shown in Fig. 2, is reached the adjusting nut on the stop screw 25 is advanced until it makes contact with the stop attached to the carriage 23, thus completing the first adjustment.

The second adjustment is carried out as follows: By means of the lever 26 the grinding wheel 30 is withdrawn from the reel blade, and the grinder carriage 23 is moved to the right end of the reel. Then, by means of the lead screw 14, the position of the right end of the reel is adjusted until the right end of the reel blade makes contact with the grinding wheel when said grinding wheel is advanced to the limit set by the adjusting nut of the stop screw 25. It is an important advantage of my invention that this second adjustment does not change the position of the point of the first adjustment relative to the path of the grinding wheel as this first adjustment was made at the pivot 3, which remained stationary during the second adjustment. As the result of this, the second adjustment completes the set up of the lawn mower grinder, both as to relief angle and equidistance of the cutting edge of the reel blades.

Following this is the grinding operation, which is accomplished as follows: First, the nut of the stop screw 25 is turned back corresponding to the depth of the feed of the grinding desired. Then, starting from the right end of the reel, in case of a right twist reel, or from the left end, in case of a left twist reel, the grinding wheel is advanced, by means of lever 26, to the limit allowed by the nut of the stop screw 25; the reel is turned until the reel blade to be sharpened rests on the tip of the blade support finger 37, then, the carriage 23 carrying the rotating grinding wheel 30, is moved along the parallel guides 21 and 22 to the other end of the reel blade. Following this, the grinding wheel is withdrawn by means of the lever 26, and is moved to the starting end, and repeats the grinding operation with the next blade of the reel.

It is to be understood that the form of my invention, herewith shown and described, is to be taken as a preferred example of the same, and that various changes in the shape, size and in the arrangement of parts may be resorted to, without departing from the spirit of my invention, or the scope of the subjoined claims.

Having thus described my invention, I claim:

1. A lawn mower blade sharpening apparatus comprising a pair of parallel supporting rails; a pair of blocks, each slidably mounted on one of said rails; manual means sliding said blocks on said rails; means securing said blocks in position on said rails; work carrying bar pivotally attached to said blocks, part of said bar extending beyond said blocks; a pair of work supporting clamps slidably mounted on said work carrying bar, one of said clamps being disposed on the part of said bar extending beyond said blocks; means securing said clamps in position on said bar; a pair of parallel guides transversely secured to said supporting rails; a grinder carriage carried by, and being movable on, said parallel guides; a base plate mounted on said carriage and being slidable transversely to said parallel guides; an adjustable stop, mounted on said carriage, limiting the sliding motion of said base plate; a grinder base connected by a horizontal hinge to said base plate; an adjusting screw, connected to said grinder base, for the angular adjusting of said grinder base around said hinge; a motor driven grinding wheel mounted on said grinder base; a blade support adjustably mounted on said grinder base, and carrying, at one end, a blade support finger having a tip disposed adjacent to said grinding wheel; a dial plate mounted on said blade support, and having a circular groove the geometric center of which is at the tip of said blade support finger; a segment plate slidably mounted in the circular groove of said dial plate; an angular scale disposed on said dial plate, measuring the angular motion of said segment plate; a set screw attached to said dial plate, securing said segment plate in position; a measuring arm slidably mounted on said segment plate and having a notched terminal.

2. An apparatus for shaping the blades of a lawn mower reel comprising a rotary grinding wheel; a blade support carrying a blade support finger having a tip and being adjustable to dispose said tip adjacent to the working face of said grinding wheel at varying diameter of said wheel; a dial plate, attached to said blade support, having degree scale and a circular groove the geometric center of which is at the tip of said blade support finger; a segment plate slidably mounted in the circular groove of said dial plate; means securing said segment plate in position in said groove; a measuring arm slidably attached to said segment plate; a terminal carried by said measuring arm, and having a notch located at the same distance from the center line of said arm as the distance between the same center line and the tip of said blade support finger.

3. The apparatus of claim 2 in which said blade support finger has a convex tip with symmetrical right and left slopes to accommodate right and left twist reels.

4. An apparatus for sharpening the blades of a lawn mower reel comprising a pair of parallel guides; a grinder carriage supported by, and being movable on, said parallel guides; a base plate mounted on said carriage and being slidable transversely to said parallel guides; manual means connected to said carriage, sliding said base plate; adjustable stop, attached to the carriage, limiting the sliding of said base plate; a grinder base connected to said base plate by a horizontal hinge; an adjusting screw connected to said grinder base effecting its angular motion around said hinge; a rotary grinding wheel mounted on said grinder base; a pair of parallel supporting rails transversely secured to said parallel guides; a pair of blocks each slidably mounted on one of said rails; manual means sliding said blocks on said rails; means securing said blocks in position on said rails; a pair of pivots each secured to one of said blocks and disposed perpendicularly to said parallel guides and rails; a work carrying bar attached to said pivots, a portion of said bar being disposed between said pivots and the remaining portion of said bar being disposed outside of said pivots; a pair of work supporting clamps slidably mounted on said work carrying bar, one of said clamps being mounted on the portion of said bar which is located outside of said pivots.

5. The apparatus of claim 4 in which said work carrying bar has an extension at each end beyond the pivot, each of said extensions being adapted to carry a work supporting clamp.

References Cited in the file of this patent

UNITED STATES PATENTS

| | | |
|---|---|---|
| 1,657,757 | Krenz | Jan. 31, 1928 |
| 2,377,126 | Brown | May 29, 1945 |
| 2,432,851 | Anderson | Dec. 16, 1947 |
| 2,466,905 | Machovec | Apr. 12, 1949 |